United States Patent [19]

Schmid

[11] 4,180,359
[45] Dec. 25, 1979

[54] MACHINE TOOL FOR MACHINING OF SHAFTS, ESPECIALLY CRANKSHAFTS

[75] Inventor: Karlheinz Schmid, Neckartenzlingen, Fed. Rep. of Germany

[73] Assignee: Gebrueder Heller Maschinenfabrik GmbH, Nuertingen, Fed. Rep. of Germany

[21] Appl. No.: 861,542

[22] Filed: Dec. 19, 1977

[30] Foreign Application Priority Data

Dec. 24, 1976 [DE] Fed. Rep. of Germany ....... 2658970

[51] Int. Cl.² .............................................. B23C 3/08
[52] U.S. Cl. .................................. 409/197; 409/199; 409/203
[58] Field of Search .................. 90/15 A, 15 R, 11 R; 82/9, 20

[56] References Cited

U.S. PATENT DOCUMENTS

| | | |
|---|---|---|
| 3,880,025 | 4/1975 | Kralowetz ........................... 90/15 R |
| 3,965,780 | 6/1976 | Yamada ................................... 82/9 |

*Primary Examiner*—Gil Weidenfeld
*Attorney, Agent, or Firm*—W. G. Fasse; D. F. Gould

[57] ABSTRACT

The present machine tool for crankshafts and the like is constructed to support the crankshaft directly adjacent to the point where the crankshaft is subjected to a machining operation. For this purpose both machining units are provided with an additional workpiece supporting device. At least one, preferably both of the additional workpiece supporting devices are axially displaceable into a rest position over or above a member cantilevered from the tool drum.

4 Claims, 5 Drawing Figures

MACHINE TOOL FOR MACHINING OF SHAFTS, ESPECIALLY CRANKSHAFTS

BACKGROUND OF THE INVENTION

The invention relates to a machine tool for the machining of shafts and the like, especially for machining of crankshafts. The ends of these crankshafts are secured in respective chucks and two machining units are displaceable in parallel to the longitudinal axis of the workpiece. Each machining unit comprises a ring shaped tool which rotates around the workpiece and which is provided with inwardly directed cutting edges. The tool is secured to the facing side of the tool drum. One of the machining units is provided with an additional workpiece supporting device which rides along with machining unit.

Customarily such machining tools are referred to as milling machines. However, it should be clear that machines of this type may also include grinding machines or the like, whereby the same considerations apply by analogy as for the milling machines.

Machines tools of this type serve especially for the round machining of the bearing pin or journal of the main bearings and of the crank bearings. Such machines are also used for the surface machining of the crankweb and of the counterweight surfaces of forged and cast crankshafts.

Machine tools as described above are known, for example, from a brochure Number 8-4550-11.73, entitled "Machining of the Main and Crank Bearings of Crankshafts by Means of Round Milling Machines", published by the Firm Heller Brothers, Nuertingen. Such machines are also described in another brochure Number Boe203d/12.75, entitled "Production Crankshaft Whirling Machines", published by the Firm Boehringer Brothers of Goeppingen.

In such machines the workpiece support device which is intended for cooperation with one of the two machining units, is arranged in such a manner that the support of the crankshaft is always located directly adjacent to the respective machining point of the respective machining unit. This is necessary to avoid the bending of the crankshaft as a result of the machining forces having regard to the fact that the crankshaft as such has a low flexurals rigidity relative to bending forces.

When the main and stroke bearings are machined simultaneously on such machines, the supporting unit supports the crankshaft at a previously machined main bearing. The one machining unit which is coordinated with the supporting unit machines the crank bearing located to the left of the supporting point, whereas the other machining unit machines the next adjacent main bearing located to the right of the supporting point. Thereafter, both machining units advance to the next bearing pair, whereby the support is applied to the main bearing previously machined. This machining continues correspondingly until the last bearing pair has been machined. Finally, the last crank bearing is machined alone while the last main bearing is supported.

Thus, this type of machining requires as many machining sequences as the number of the crank bearings plus one additional machining sequence for the first main bearing. It is known for an economic machining of crankshafts to first machine all main bearings on a special main bearing machining mill in a single machining operation and to then machine the crank bearings of a machine tool of the above type.

This type of machining results in a substantial increase in the efficiency because only one machining sequence is required for each set of two crank bearings and because only one additional machining sequence is necessary for all main bearings on a special main bearing machine.

However, for the simultaneous machining of two crank bearings, it is necessary for an optimal machining that those crank journals are machined in common which are located on a respective common axis. Stated differently, this means in machines of the Heller System, wherein the crankshaft rotates during the machining, that the rotational feed advance speed is variable in response to the angular positions of the crank pin or journal in order to achieve the most advantageous cutting conditions. In machines in which the crankshaft is stationary and the tool rotates eccentrically about the stationary crankshafts, as in the Heller System, it means, that due to the position of the crank pin center, for machining one must always turn at the elevation of the main bearing axis or at the center elevation of the outer whirling gyro.

For the above reasons it is necessary to machine in common, for example, a six cylinder crankshaft, the crank pins 1 and 6; 2 and 5; as well as 3 and 4, which are always located at a common axis. However, since the additional workpiece support device is coordinated with a certain machining unit, this means that said supporting device supports the crankshaft only adjacent to one of the two crank pins or journals during the machining of the outer crank pin or journal; whereas the other crank pin or journal is subject to being bent out depending on the size of the spacing of the spacing between the other crank pin or journal and the supporting unit. For this reason, the machine tools of the above type have been used so far purely for the crank bearing machining of smaller crankshafts such as four cylinder passenger car crankshafts.

OBJECTS OF THE INVENTION

In view of the foregoing, it is the aim of the invention to achieve the following objects singly or in combination:

to remove the drawbacks of the prior art as described above, more specifically, to provide a machining tool in which the crankshaft may always be supported adjacent to the respective machining position and on both sides thereof;

to provide a crankshaft machining tool which may be used regardless of the number of crank pins and regardless of the size of the crankshaft to be machined, whereby the precision of the machining operation shall not be influenced by such considerations as the number of crank pins and the size of the crankshaft;

to provide a crankshaft milling machine wherein the crankshaft being machined is always supported on both sides of the machining location independently of the type of bearing being machined, that is regardless whether it is a crank bearing or a main bearing;

to arrange additional support units or devices in such a manner that their use and movement in the machine tool will not interfere with each other; and to provide a milling machine which will be useful for all types and sizes of crankshafts without diminishing the milling precision.

SUMMARY OF THE INVENTION

This objective has been achieved according to the invention, by providing, respectively, both machining units, that is each machining unit with an additional workpiece supporting device, whereby at least one of these supporting devices is axially displaceable into a rest position over and surrounding a portion of the tool drum cantilevered from the machining unit.

The advantages achieved by this invention are seen in that it is now possible to directly support the crankshaft during the machining of the respective outer crank bearings as well as during the machining of the inner crank bearings. In the first instance, when the outer crank bearings are machined the supporting is effective directly adjacent to the two machining locations at the neighboring main bearing. In the second instance, during the machining of the inner crank bearings the support is effective at the central main bearing by means of a single supporting device directly between the two machining locations. During this last mentioned machining the other supporting device is in a rest position, whereby a mutual hindering of the two supporting devices is eliminated. For the machining of crankshafts in which there is no main bearing between the two crank bearings which are to be machined simultaneously, that is the two crank bearings are located directly adjacent to each other, for example as is the case in doubly supported two cylinder crankshafts, a further embodiment of the invention provides that the two supporting devices are axially displaceable into a rest position respectively over and surrounding a cantilevered portion of the tool drum.

In a further suitable embodiment according to the invention the supporting device is constructed as a C-shaped base frame provided with workpiece support jaws, whereby the axial displacement of the supporting device is accomplished by means of two synchronously operating adjustment drives.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS

Figure 1:
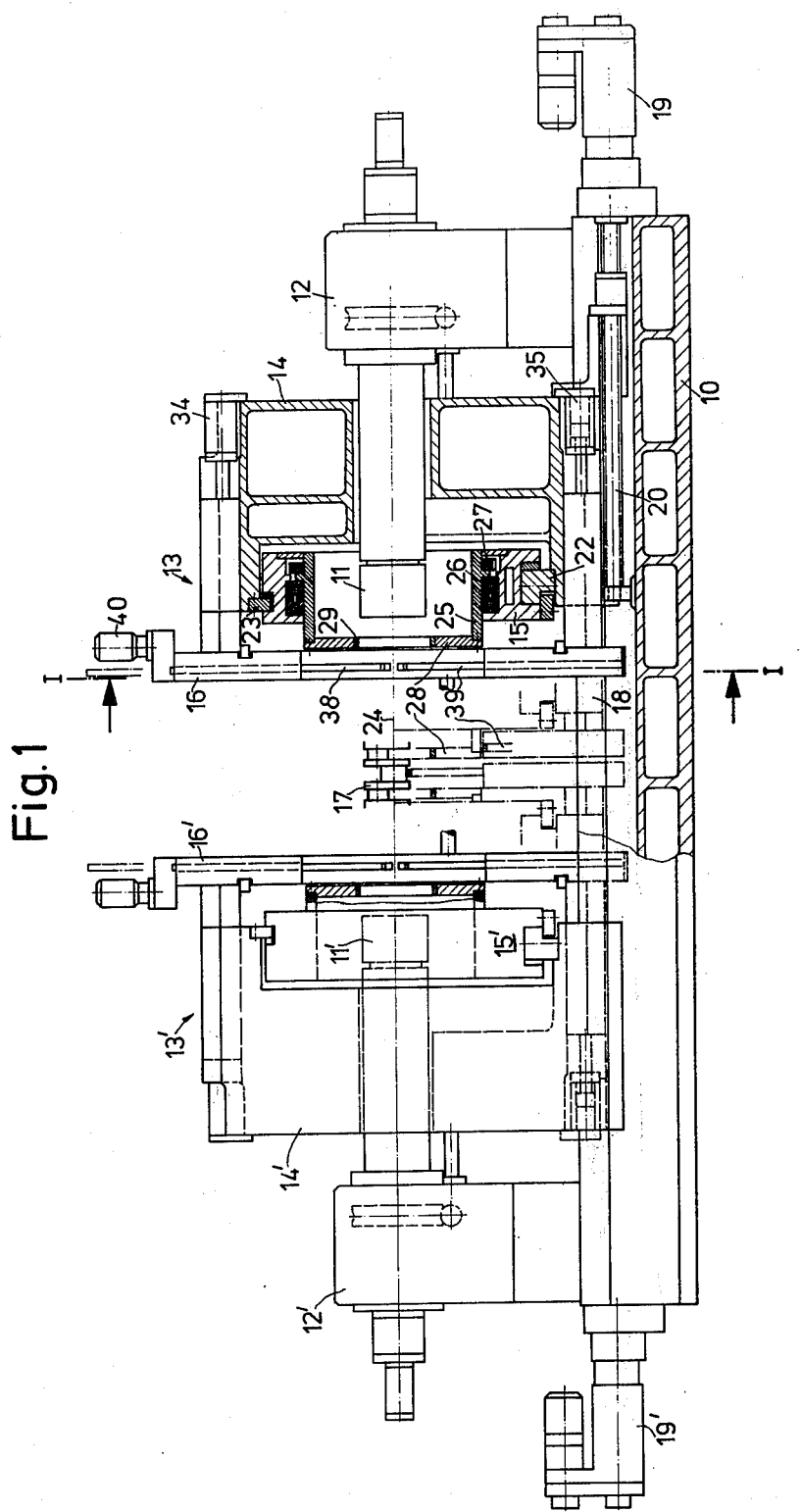
FIG. 1 shows a longitudinal view of the machine tool, partially in section, whereby the view direction X is indicated in FIG. 2.

The machine tool shown in the drawings comprises a machine bed 10 secured to a base having an inclined supporting surface. Two vices 12 and 12' are mounted on the machine bed. The vices comprise synchronously driven, workpiece holding chucks 11 and 11'. Two machining units 13 and 13' are also mounted on the machine bed. The machining units comprise two frame members 14 and 14' each carrying a cross slide 15 and 15' and each further carrying a workpiece supporting device 16 and 16' shown in detail in FIG. 2.

The frame members 14 and 14' are arranged for displacement in parallel to the axis of the workpiece crankshaft 17 chucked in the chucks 11 and 11', said displacement being guided by longitudinal guides 18 on the machine bed 10. Each frame member is driven by a respective drive means 19 and 19' through a ball roller spindle 20 and 20'.

The machining units are constructed mirror-symmetrically. Therefore, the further details will now be described by way of the example of the right-hand machining unit 13.

The frame member 14 carries a cross slide 15 which is guided without play in two guides 22 and 23 below and above the crankshaft center axis 24. The frame member 14 is displaceable across the longitudinal machine bed guide 18.

A tool drum 25 is supported without play in the cross slide 15 by means of biassed anti-friction bearings 26. The tool drum 25 is driven through a gear wheel 27 by means of any suitable, conventional drive device, the details of which are not illustrated. The tool drum 25 cantilevers in the direction toward the machine center and out of the cross slide 15. The tool drum 25 carries at its facing side a ring shaped milling tool 28, the cutting edges 29 of which face inwardly.

Figure 2:
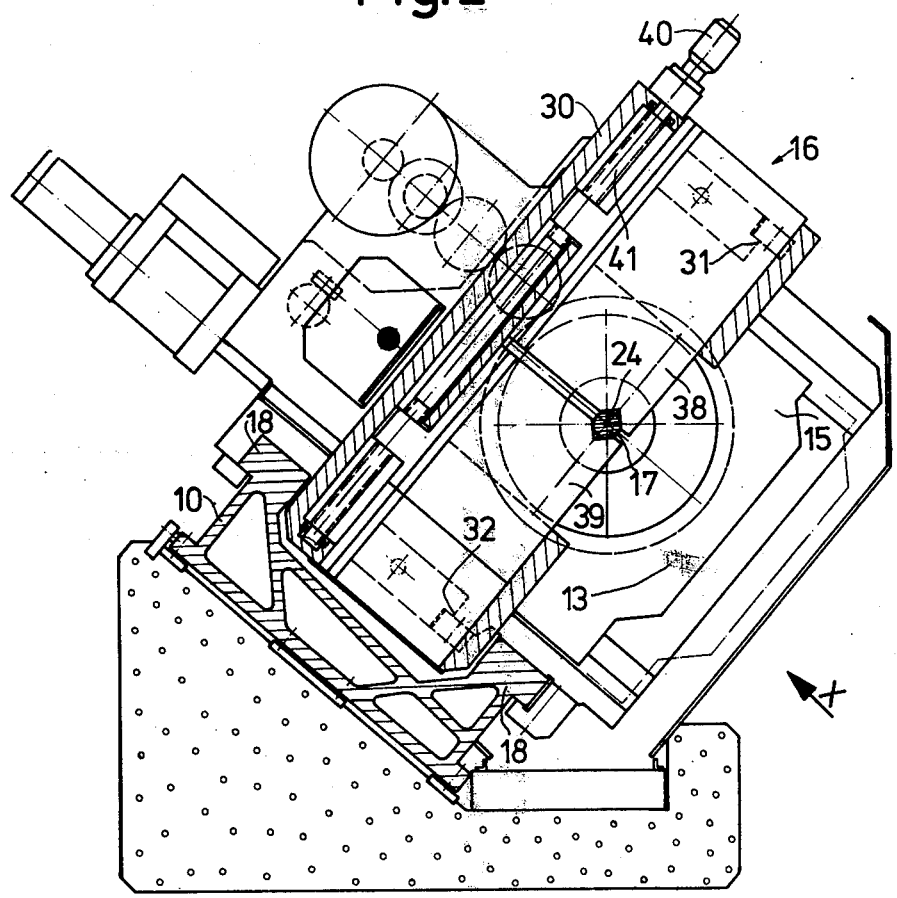
FIG. 2 is a section along the section line I—I in FIG. 1.

As shown in FIG. 2, the workpiece supporting device 16 comprises a C-shaped base frame 30 which is guided on the frame member 14 by means of two guides 31 and 32. The workpiece support device 16 is movable in parallel to the central axis 24 of the crankshaft from a work position into a rest position and vice versa by means of synchronously operating adjustment or positioning drives 34 and 35 which shift the workpiece supporting device from one position into the other. The C-shaped base frame 30 carries two workpiece support jaws 38 and 39 which are driven by a drive device 40 through a spindle 41 having a left threading and a right threading, whereby the jaws may be adjusted relative to each other and perpendicularly to the base frame guides 31, 32. The jaws 38, 39 support the crankshaft 17 during the machining in a main bearing and in a centered manner.

The adjustment range of the workpiece support device 16, that is the displacement distance of the base frame 30 in the frame member 14 is so designed that the base frame 30 in its supporting position, is located axially in front of the milling ring 28. The position of the base frame 30 is such that the workpiece support jaws 38 and 39 may come into a supporting engagement with the main bearing directly neighboring the crank bearing to be machined. In case it is necessary that the workpiece support device 16 is withdrawn into the rest position as shown in FIG. 1 by dash-dotted lines, the base frame 30 with its supporting jaws 38 and 39 withdrawn into the end position, is shifted axially beyond the cantilevered tool drum 25 to such an extent that the entire supporting device 16 does not protrude anymore above the most forward drum plane.

Figure 3A:
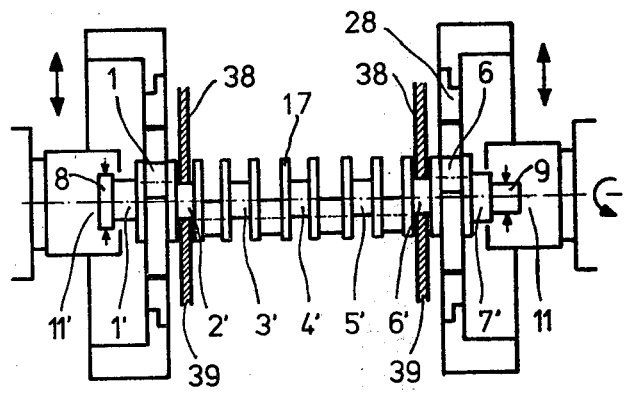
FIGS. 3a to 3c illustrate a schematic machining sequence using the example of a six cylinder crankshaft.
Figure 3B:
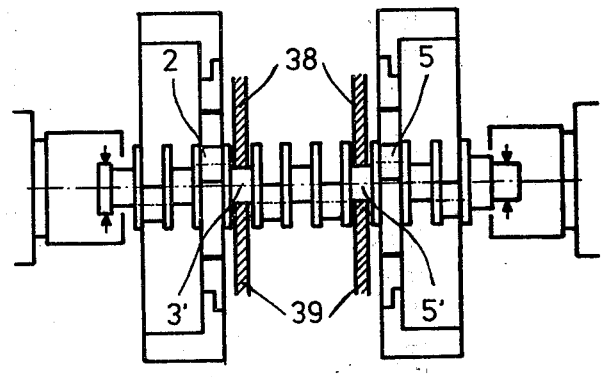
Figure 3C:
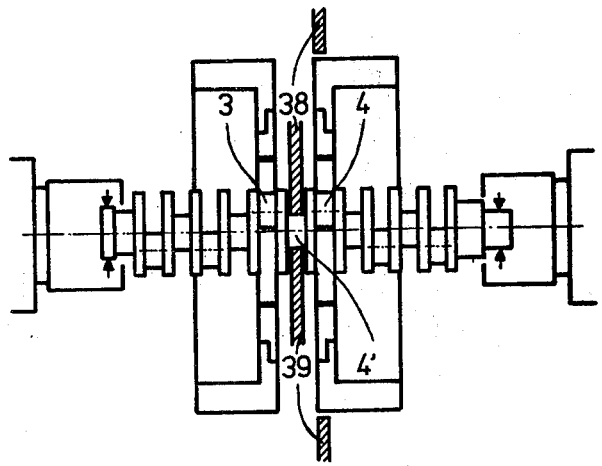

The FIGS. 3a to 3c show the work sequence of the machine tool with reference to an example of a six cylinder crankshaft supported in a sevenfold manner. All main bearings 1' to 7' and the end flange 8 as well as the end stud 9, at which the crankshaft is chucked, have already been pre-machined.

In the first machining step (FIG. 3a) the crank journals 1 and 6 are machined while simultaneously providing a support in the main bearings 2' and 6'.

In the second workstep (FIG. 3b) the crank journals 2 and 5 are being machined while simultaneously providing a support in the main bearings 3' and 5'.

In the third workstep (FIG. 3c) the crank journals 3 and 4 are being machined, whereby the main bearing 4' is being supported by means of a supporting device, whereas the other supporting device is located in its rest position.

Although the invention has been described with reference to specific example embodiments, it is to be understood, that it is intended to cover all modifications and equivalents within the scope of the appended claims.

I claim:

1. A machine tool for milling crankshaft (17) having a longitudinal axis (24), comprising a machine bed (10), crankshaft clamping means (12, 12') including chuck means (11, 11') operatively supported on said machine bed (10), two milling units (13, 13') also operatively supported on said machine bed for displacement along the machine bed in parallel to said longitudinal axis (24) of said crankshaft, each milling unit (13, 13') comprising respective tool drum means (25) arranged substantially coaxially relative to said longitudinal crankshaft axis (24), said machine tool further comprising crankshaft supporting means (16, 16') each carried by the respective milling unit (13, 13'), at least one of said crankshaft supporting means (16) being movably carried by the respective milling unit (13), and drive means (34, 35) operatively connected to said one crankshaft supporting means (16) for moving the respective crankshaft supporting means back and forth in parallel to said longitudinal crankshaft axis (24) independently of any movement of the respective milling unit between a working position and a rest position so that said crankshaft supporting means may support the crankshaft in the working position directly adjacent to the respective one of said tool drum means and so that said crankshaft supporting means may take up said rest position around the respective tool drum means, whereby pairs of crankshaft bearing surfaces having a common axis may be machined simultaneously even if said bearing surfaces are located adjacent to each other.

2. The machine tool of claim 1, wherein said tool drum means comprise a free end cantilevering from the respective milling unit and relative to the respective to the respective chuck means (11), said machine tool further comprising ring shaped milling means (28, 29) carried by the respective tool drum means at the free end thereof, said one crankshaft supporting means being positionable into said rest position in which said one crankshaft supporting means is substantially in vertical alignment with said free end of the respective tool drum means.

3. The machine tool of claim 1, wherein each of said machine tool drum means comprises a free end cantilevering from the respective milling unit, and wherein each of said crankshaft support means is movable in parallel to said longitudinal crankshaft axis back and forth between respective working positions in which the support means hold the crankshaft, and a respective rest position in which the support means are substantially in vertical alignment with the free end of the respective tool drum means.

4. The machine tool of claim 1, wherein said crankshaft supporting means comprise a C-shaped frame (30), workpiece support jaws (38, 39) carried by said C-shaped frame (30), and jaw position adjustment means (40, 41) operatively connected to said support jaws for moving said support jaws toward and away from each other.

* * * * *